(12) United States Patent
Dill et al.

(10) Patent No.: US 10,189,383 B2
(45) Date of Patent: Jan. 29, 2019

(54) VEHICLE SEAT

(71) Applicant: JOHNSON CONTROLS COMPONENTS GMBH & CO. KG, Kaiserslautern (DE)

(72) Inventors: Thomas Dill, Heiligenmoschel (DE); Joerg Rapedius, Muenchweiler (DE); Viktor Enns, Keiserslautern (DE)

(73) Assignee: JOHNSON CONTROLS COMPONENTS GMBH & CO. KG, Kaiserslautern (DE)

(*) Notice: Subject to any disclaimer, the term of this patent is extended or adjusted under 35 U.S.C. 154(b) by 173 days.

(21) Appl. No.: 15/030,922

(22) PCT Filed: Oct. 10, 2014

(86) PCT No.: PCT/EP2014/071742
§ 371 (c)(1),
(2) Date: Apr. 21, 2016

(87) PCT Pub. No.: WO2015/058975
PCT Pub. Date: Apr. 30, 2015

(65) Prior Publication Data
US 2016/0250949 A1 Sep. 1, 2016

(30) Foreign Application Priority Data

Oct. 23, 2013 (DE) .................. 10 2013 221 576
Feb. 7, 2014 (DE) .................. 10 2014 202 239

(51) Int. Cl.
*B60N 2/36* (2006.01)
*B60N 2/22* (2006.01)
(Continued)

(52) U.S. Cl.
CPC ............. *B60N 2/366* (2013.01); *B60N 2/015* (2013.01); *B60N 2/06* (2013.01); *B60N 2/20* (2013.01);
(Continued)

(58) Field of Classification Search
CPC ...... B60N 2/366; B60N 2/433; B60N 2/2245; B60N 2/20; B60N 2/2878; B60N 2/015;
(Continued)

(56) References Cited

U.S. PATENT DOCUMENTS

2014/0159449 A1* 6/2014 Kamper .................. B60N 2/36
297/257

FOREIGN PATENT DOCUMENTS

DE 100 28 403 A1 12/2001
DE 10 2006 009 613 B3 9/2007
(Continued)

*Primary Examiner* — Milton Nelson, Jr.
(74) *Attorney, Agent, or Firm* — McGlew and Tuttle, P.C.

(57) ABSTRACT

A vehicle seat (1) with a seat segment (14) which includes a first seat area (11) with a first backrest (21) that can be pivoted about a pivot axis (A) running in a transverse direction (y) and a second seat area (12) with a second backrest (22) that can be pivoted about the pivot axis (A). The second backrest (22) is equipped with a locking device (9) which interacts with a locking bracket (8) provided on the first backrest (21). The locking device (9) includes at least one axis pin (92) with a longitudinal axis (94) that is inclined relative to the transverse direction (y).

19 Claims, 4 Drawing Sheets

(51) Int. Cl.
*B60N 2/28* (2006.01)
*B60N 2/20* (2006.01)
*B60N 2/433* (2006.01)
*B60N 2/015* (2006.01)
*B60N 2/235* (2006.01)
*B60N 2/06* (2006.01)

(52) U.S. Cl.
CPC ......... *B60N 2/2245* (2013.01); *B60N 2/2356* (2013.01); *B60N 2/2878* (2013.01); *B60N 2/36* (2013.01); *B60N 2/433* (2013.01); *B60N 2205/35* (2013.01)

(58) Field of Classification Search
CPC .......... B60N 2/36; B60N 2/2356; B60N 2/06; B60N 2205/35
USPC ........................................................ 297/257
See application file for complete search history.

(56) References Cited

FOREIGN PATENT DOCUMENTS

| | | |
|---|---|---|
| DE | 10 2007 011 874 A1 | 9/2008 |
| EP | 1 810 873 A | 7/2007 |
| JP | 2012/071701 A | 4/2012 |
| WO | 2012/152361 A1 | 11/2012 |

\* cited by examiner

VEHICLE SEAT

CROSS REFERENCE TO RELATED APPLICATIONS

This application is a United States National Phase Application of International Application PCT/EP2014/071742 filed Oct. 10, 2014 and claims the benefit of priority under 35 U.S.C. § 119 of German Patent Applications 10 2013 221 576.2 filed Oct. 23, 2013 and 10 2014 202 239.8 filed Feb. 7, 2014 the entire contents of which are incorporated herein by reference.

FIELD OF THE INVENTION

The invention relates to a vehicle seat having a seat segment which comprises a first seating space having a first backrest which can be pivoted about a pivot axis which extends in the transverse direction and a second seating space having a second backrest which can be pivoted about the pivot axis, wherein there is arranged on the second backrest a locking device which cooperates with a curved locking member which is provided on the first backrest.

BACKGROUND OF THE INVENTION

DE 10 2006 009 613 B3 discloses a generic vehicle seat. The vehicle seat which is constructed as a rear seat has a backrest with at least a first backrest portion and a second backrest portion, wherein the first backrest portion has a lower extension which protrudes in the transverse direction and the second backrest portion is articulated to the lower extension. The second backrest portion is arranged beside the first backrest portion and can be locked laterally in a first locking device to the first backrest portion and can be folded forward after unlocking via an unlocking device. The first locking device has in this instance a rotary latch lock which is provided on the second backrest portion and a locking bolt which is provided on the first backrest portion for receiving in the rotary latch lock.

WO 2012/152361 A1 discloses, for example, a locking device which is suitable for this purpose.

The locking device or the rotary latch lock in this instance is fitted laterally to one backrest and protrudes in the transverse direction from the structure of this backrest. The locking counter-piece, in particular a curved locking member or a locking pin, is then fitted laterally to the other backrest and protrudes in the transverse direction from the structure of this backrest.

SUMMARY OF THE INVENTION

An object of the invention is to improve a vehicle seat of the type mentioned in the introduction, in particular to reduce the overhang of the locking device and the curved locking member in the transverse direction beyond the structure of the backrest.

A generic vehicle seat has a seat segment which comprises a first seating space having a first backrest which can be pivoted about a pivot axis which extends in the transverse direction and a second seating space having a second backrest which can be pivoted about the same pivot axis. According to the invention, there is arranged on the second backrest a locking device which cooperates with a curved locking member which is provided on the first backrest, wherein the locking device comprises at least one axial pin whose longitudinal axis extends in an inclined manner relative to the transverse direction.

The locking device is thus according to the invention, with respect to an arrangement which is known from the prior art, rotated about an axis which extends at least substantially in a vertical direction.

The overhang of the locking device beyond the structure of the backrest in the transverse direction is thereby reduced. In particular, a protruding head of the axial pin extends to a lesser extent in the transverse direction toward the first backrest than in an arrangement in which the axial pins of a locking device extend in the transverse direction.

Advantageously, the longitudinal axis of the axial pin defines with the transverse direction an inclination angle of from 5° to 15°, preferably substantially 10°. In an angular range, the extension of the locking device in the transverse direction away from the structure of the backrest is minimal.

The locking device preferably comprises a rotary latch, which is pivotably supported about the axial pin. The longitudinal axis of the axial pin forms the pivot axis of the rotary latch in this case.

The curved locking member preferably comprises a locking region around which the rotary latch engages when the locking device is locked to the curved locking member.

In this instance, the locking region is preferably constructed in a substantially linear manner and extends along a curved member axis.

According to an advantageous embodiment of the invention, the curved member axis extends in an inclined manner relative to the transverse direction.

Preferably, the curved member axis defines in this instance with the transverse direction an inclination angle of from 5° to 15°, preferably approximately 10°.

In a particularly advantageous manner, when the locking device is locked to the curved locking member, the curved member axis extends parallel with the longitudinal axis of the axial pin.

Preferably, the locking device comprises an additional axial pin about which a clamping cam and/or a catch cam which serves to secure the rotary latch when the locking device is locked is pivotably supported.

Advantageously, the additional axial pin has in this instance another longitudinal axis which extends parallel with the longitudinal axis of the axial pin, about which the rotary latch is pivotably supported.

The invention is explained in greater detail below with reference to an advantageous embodiment which is illustrated in the Figures. However, the invention is not limited to this embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENTS

Figure 1:
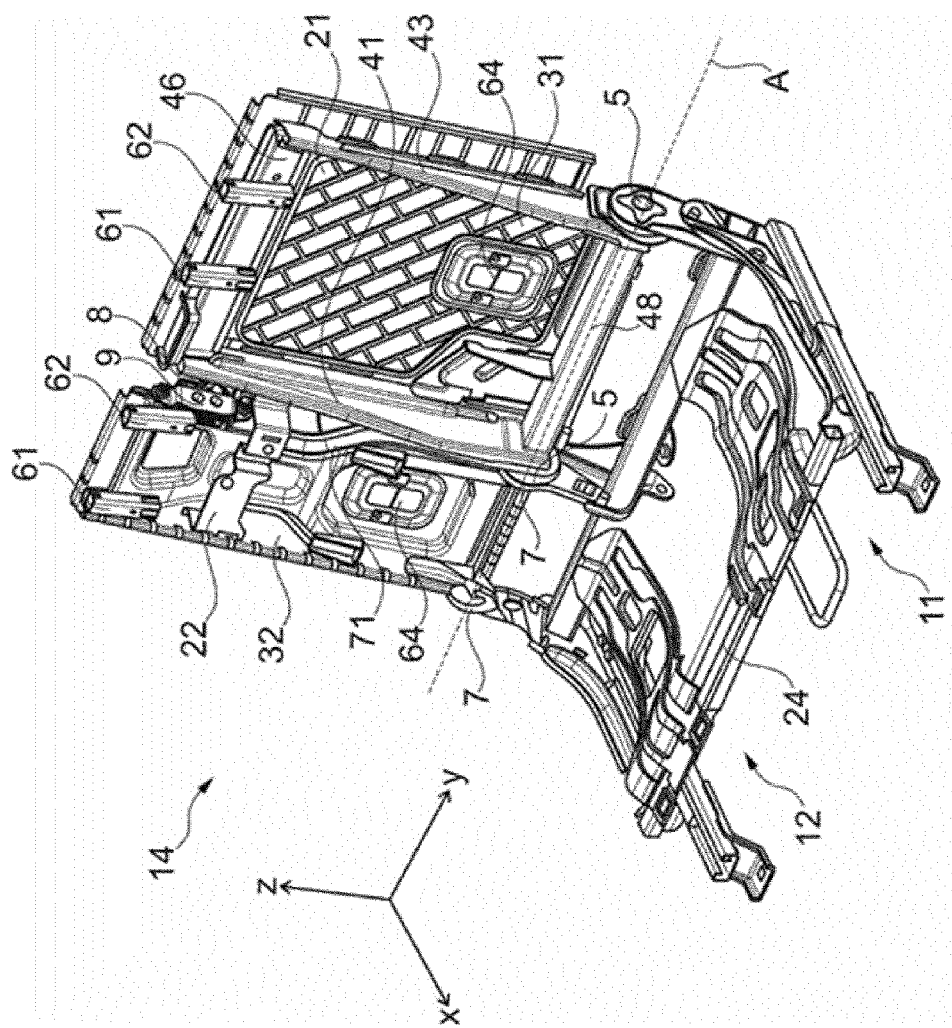
FIG. 1 is a perspective illustration of a seat segment of a vehicle seat comprising two seating spaces without upholstery in the position for use.
Figure 2:
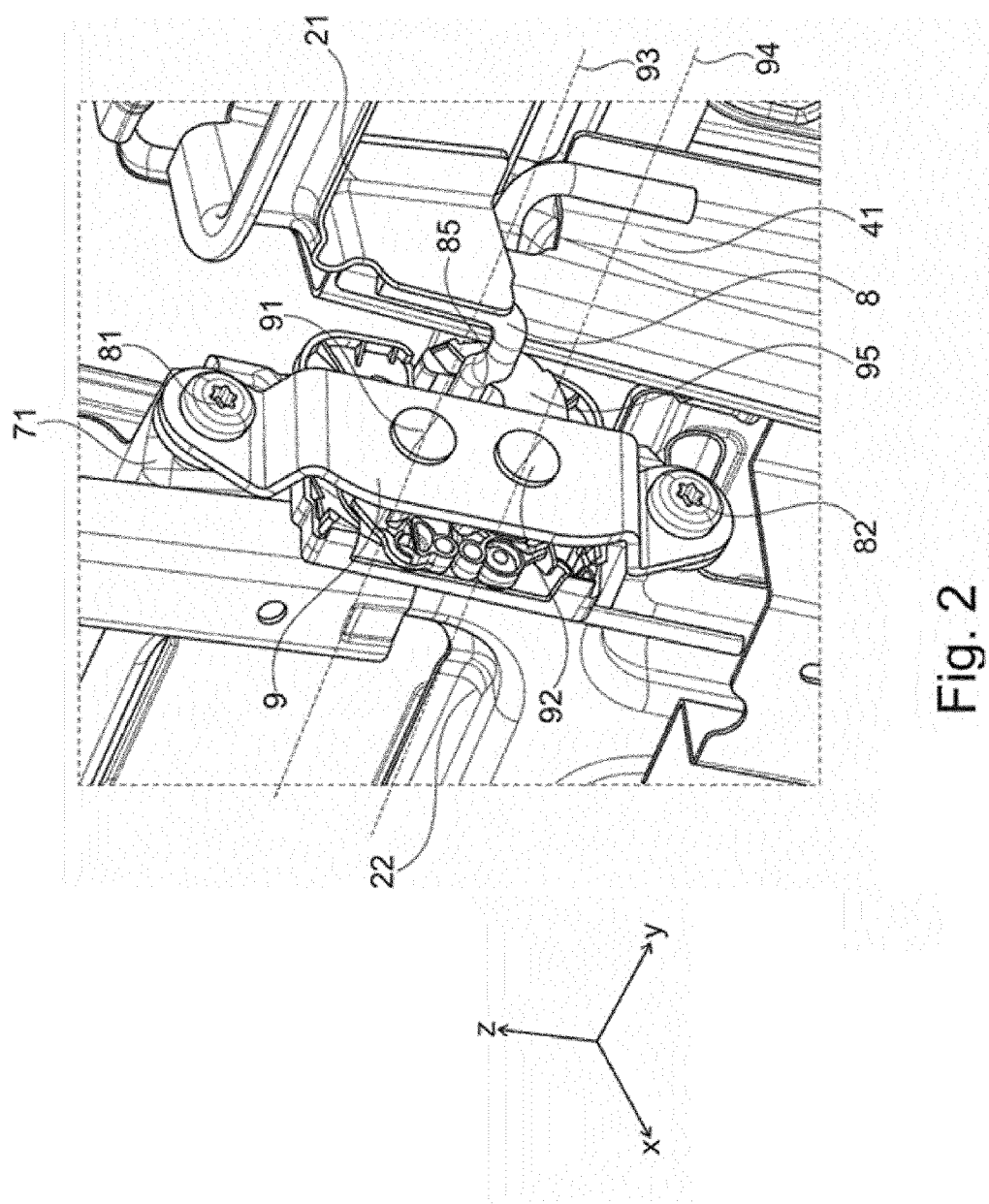
FIG. 2 is a detailed illustration from FIG. 1 in the region of the locking device.
Figure 3:
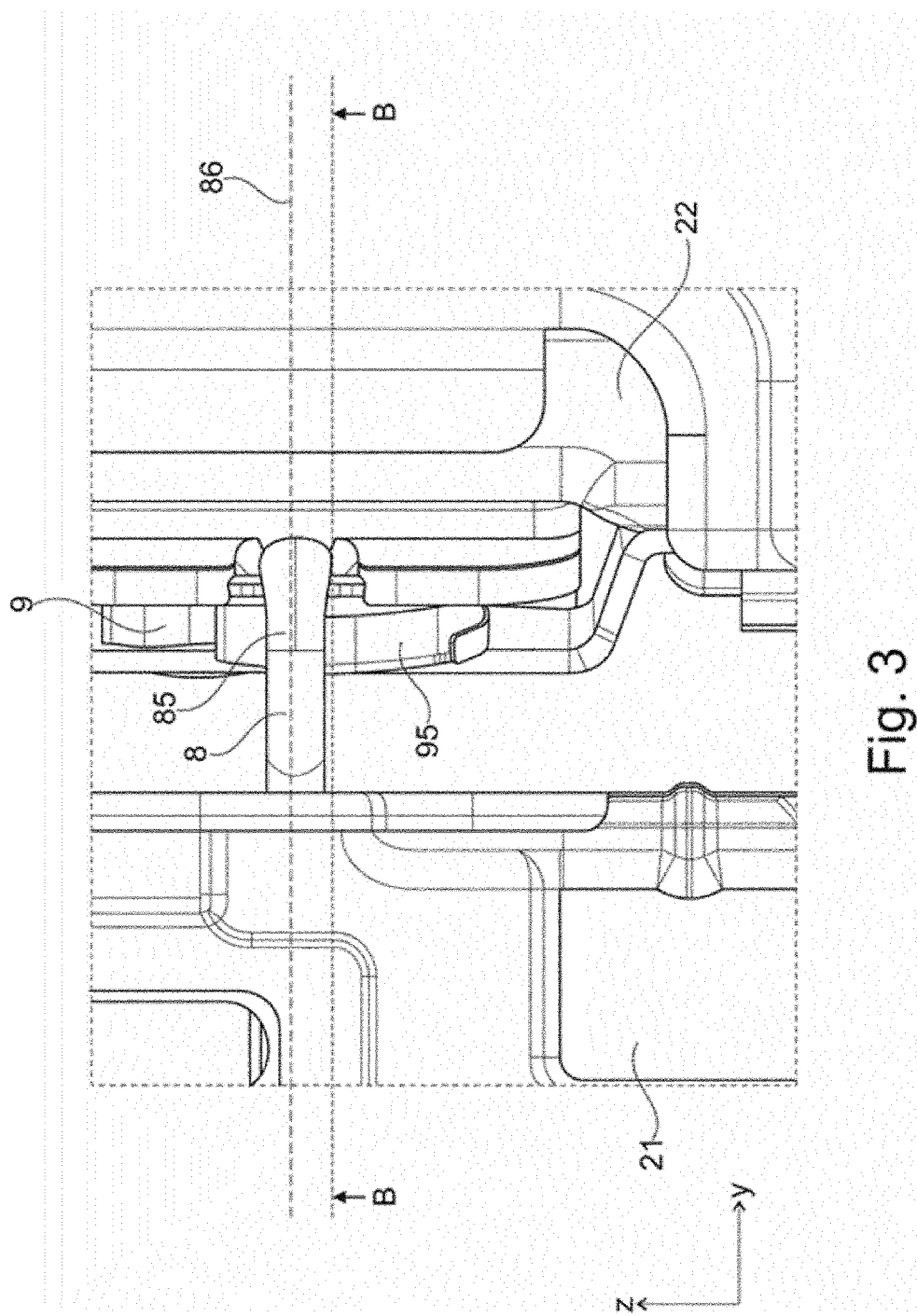
FIG. 3 is a rear view of the region of FIG. 2 with an unlocked locking device in the travel direction in the position for use.
Figure 4:
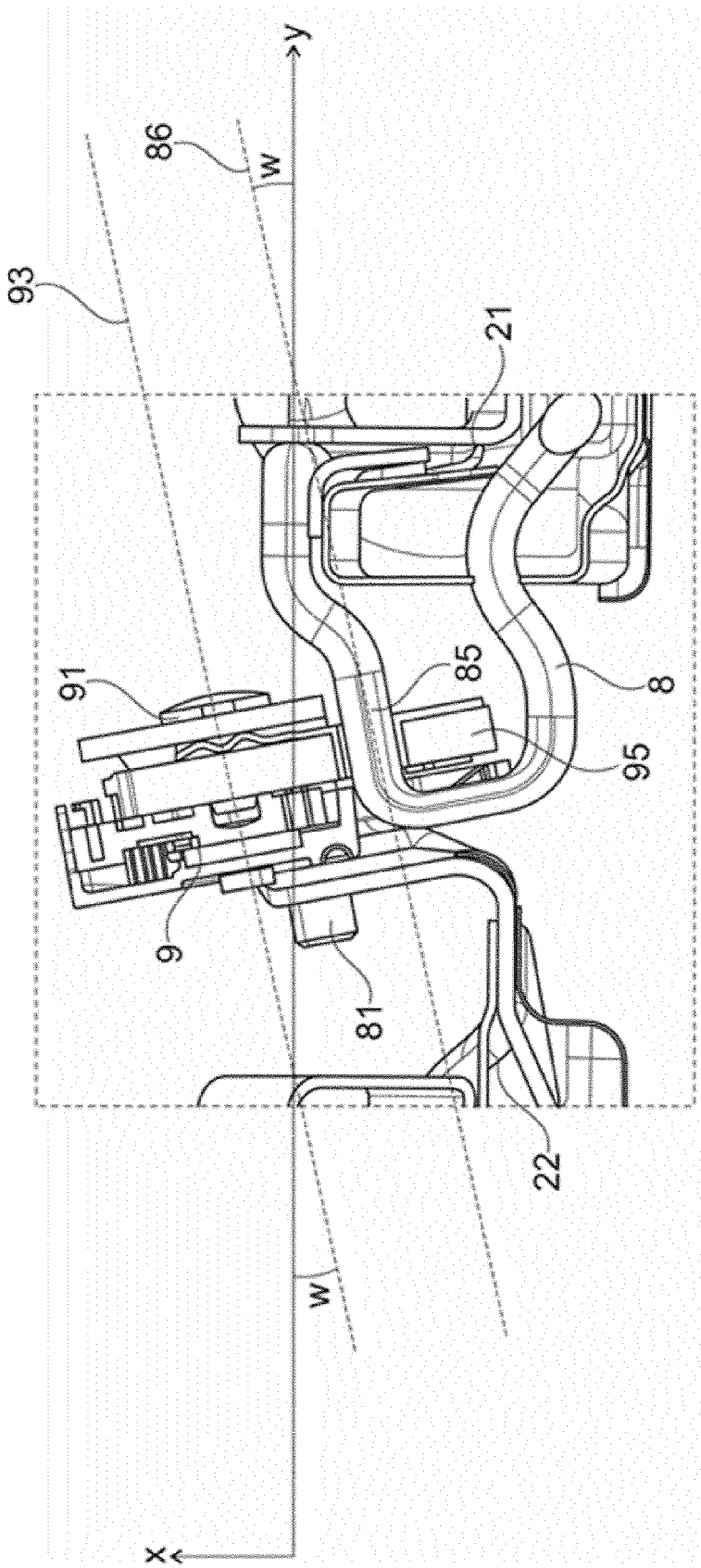
FIG. 4 is a sectioned view along the line B-B in FIG. 3 in the vertical direction.

A vehicle seat is constructed as a rear seat installation of a motor vehicle. The vehicle seat 1 comprises a seat segment 14 with a seat member 24 and another seat segment (not illustrated) which are connected independently of each other to the vehicle structure of the motor vehicle so as to be able to be longitudinally adjusted by means of longitudinal adjusters.

The arrangement of the vehicle seat within the vehicle and the conventional travel direction x thereof define the direction indications used below. In this instance, a direction which is orientated perpendicularly relative to the ground is referred to below as the vertical direction z and a direction perpendicular to the vertical direction z and perpendicular to the travel direction x is referred to below as the transverse direction y. The vertical direction z in this instance also defines angles of up to 30° with respect to the perpendicular and comprises in particular the orientation of a backrest of the vehicle seat in a substantially upright position for use, which backrest is mounted in the vehicle.

The seat segment 14 takes up approximately 60% of the total width of the vehicle seat, whilst the other seat segment which is not illustrated takes up approximately 40% of the width. A first backrest 21 and a second backrest 22 are fitted to the seat member 24 so as to be able to be pivoted about a pivot axis A. The pivot axis A extends horizontally in the transverse direction y.

The first backrest 21 forms with a portion of the seat member 24 a first seating space 11. The second backrest 22 forms with a portion of the seat member 24 a second seating space 12. The second backrest 22 is arranged in the transverse direction y between the first backrest 21 and the additional seat segment which is not illustrated.

The first backrest 21 comprises a first backrest sheet 31 which is reinforced by means of a right longitudinal strut 41, a left longitudinal strut 43, an upper transverse strut 46 and a lower transverse strut 48. The longitudinal struts 41, 43 are constructed in a substantially parallelepipedal and linear manner. When the first backrest 21 is in the substantially upright position for use, the longitudinal struts 41, 43 extend in a vertical direction z from the pivot axis A to the upper end of the first backrest 21, which upper end faces away from the pivot axis A.

The second backrest 22 comprises a second backrest sheet 32 and a lateral strut 71. When the second backrest 22 is in the substantially upright position for use, the lateral strut 71 extends from the pivot axis A to the upper end of the second backrest 22 facing away from the pivot axis A.

The lateral strut 71 comprises a lower region which faces the pivot axis A and which is constructed in a substantially parallelepipedal and linear manner and which extends in a vertical direction z when the second backrest 22 is in the substantially upright position for use. The lateral strut 71 comprises an upper region which faces away from the pivot axis A and which is constructed in a substantially parallelepipedal and linear manner and which extends in a vertical direction z when the second backrest 22 is in the substantially upright position for use. Between the lower region and the upper region of the lateral strut 71 there is provided a central region which, when the second backrest 22 is in a substantially upright position for use, extends in an inclined manner relative to the vertical direction z and in an inclined manner relative to the transverse direction y.

The upper region of the lateral strut 71 is consequently further away from the right longitudinal strut 41 of the first backrest 21 than the lower region of the lateral strut 71.

Each of the backrests 21, 22 further comprises a first headrest receiving member 61, a second headrest receiving member 62 and a top-tether strap 64 which are each constructed in an identical manner.

The seat member 24 and the backrests 21, 22 are provided in a manner known per se with upholstery members which are not illustrated. The first backrest 21 takes up approximately 40% of the total width of the vehicle seat, whilst the second backrest 22 takes up approximately 20% of that width.

The first backrest 21 is connected to the seat member 24 by means of two fittings 5. The fittings 5 are in this instance structurally identical. Each fitting 5 has a first fitting member which is securely connected to the first seat member 24, that is to say, which is secured to the seat member, and a second fitting member which is securely connected to the first backrest 21, that is to say, which is secured to the backrest, which can be pivoted relative to each other. The two fitting members may in structural terms form a disc-like unit and, for example, be held together by means of a clamping ring.

In this instance, the fittings 5 are each constructed as a catch fitting, that is to say, the two fitting members can be locked to each other by means of movable bars. The bars are, for example, moved into a locking position by means of a resiliently loaded cam. The first backrest 21 can, on the one hand, be adjusted by means of the fittings 5 in terms of their inclination relative to the first seat member 24 into different positions for use and can, on the other hand, be pivoted forward into a non-use position.

The second backrest 22 is in this instance connected to the seat member 24 by means of two rotary bearings 7.

Close to the upper end of the second backrest 22 facing away from the pivot axis A, there is arranged a locking device 9 which cooperates with a curved locking member 8 which is provided on the first backrest 21. The locking device 9 is secured to the side of the upper region of the lateral strut 71, which side faces the first backrest 21. The curved locking member 8 is secured to the side of the right longitudinal strut 41, which side faces the second backrest 22.

When the locking device 9 is locked to the curved locking member 8, the second backrest 22 can be pivoted together with the first backrest 21 relative to the seat member 24 about the pivot axis A. When the locking device 9 is unlocked, the second backrest 22 can be pivoted independently of the first backrest 21 relative to the seat member 24 from a substantially upright position for use forward and downward into a non-use position.

The locking device 9 is secured to the lateral strut 71 by means of a first securing element 81 and a second securing element 82. The securing elements 81, 82 are in this instance constructed to be substantially circular-cylindrical and substantially rotationally-symmetrical with respect to a center axis. In this instance, the securing elements 81, 82 are constructed as screws. Other embodiments of the securing elements 81, 82, for example, as clinch bolts, are also conceivable.

The center axes of the securing elements 81, 82 extend in an inclined manner with respect to the transverse direction y. When the second backrest 22 is in a substantially upright position for use, the center axes of the securing elements 81, 82 extend substantially perpendicularly to the vertical direction z and in an inclined manner, but not perpendicularly to the travel direction x. When the second backrest 22 is in the non-use position, the center axes of the securing elements 81, 82 extend substantially perpendicularly to the travel direction x and in an inclined manner, but not perpendicularly to the vertical direction z.

The locking device 9 comprises a first axial pin 91, about which a clamping cam and a catch cam are pivotably supported. The locking device 9 comprises a second axial pin 92, about which a rotary latch 95 is pivotably supported. The structure and the function of the locking device 9 is described in WO 2012/152361 A1, the content of which is expressly incorporated herein by reference.

The axial pins 91, 92 are in this instance constructed to be substantially circular-cylindrical and substantially rotationally symmetrical with respect to a longitudinal axis 93, 94, respectively. The first longitudinal axis 93 of the first axial pin 91 forms the rotation axis of the clamping cam and the catch cam. The second longitudinal axis 94 of the second axial pin 92 forms the rotation axis of the rotary latch 95.

The longitudinal axes 93, 94 of the axial pins 91, 92 extend in an inclined manner relative to the transverse direction y. When the second backrest 22 is in a substantially upright position for use, the longitudinal axes 93, 94 of the axial pins 91, 92 extend substantially perpendicularly to the vertical direction z and in an inclined manner, but not perpendicularly to the travel direction x. When the second backrest 22 is in the non-use position, the longitudinal axes 93, 94 of the axial pins 91, 92 extend substantially perpendicularly to the travel direction x and in an inclined manner, but not perpendicularly to the vertical direction z.

The curved locking member 8 is constructed as a metal wire which is bent several times and in this instance welded to the first backrest sheet 31 and to the right longitudinal strut 41 of the first backrest 21. When the locking device 9 is locked to the curved locking member 8, the rotary latch 95 engages around a locking region 85 of the curved locking member 8.

The locking region 85 is a substantially linear portion of the curved locking member 8 and extends along a curved member axis 86.

The curved member axis 86 extends in an inclined manner relative to the transverse direction y. When the first backrest 21 is in a substantially upright position for use, the curved member axis 86 extends substantially perpendicularly to the vertical direction z and in an inclined manner, but not perpendicularly to the travel direction x. When the first backrest 21 is in the non-use position, the curved member axis 86 extends substantially perpendicularly to the travel direction x and in an inclined manner, but not perpendicularly to the vertical direction z.

The longitudinal axes 93, 94 of the axial pins 91, 92 extend parallel with each other and parallel with the center axes of the securing elements 81, 82. When the locking device 9 is locked to the curved locking member 8, the curved member axis 86 extends parallel with the longitudinal axes 93, 94 of the axial pins 91, 92 and parallel with the center axes of the securing elements 81, 82.

When the second backrest 22 is in a substantially upright position for use, the longitudinal axes 93, 94 of the axial pins 91, 92 define with the transverse direction y an inclination angle W of in this instance approximately 10°. The inclination angle W may also have other values and is preferably in a range between 5° and 15°.

When the first backrest 21 is in a substantially upright position for use, the curved member axis 86 of the locking region 85 of the curved locking member 8 defines with the transverse direction y an inclination angle W of in this instance approximately 10°. The inclination angle W may also have other values and is preferably in a range between 5° and 15°.

As a result of the selected arrangement, the overhang of the locking device 9 beyond the structure of the backrest in the transverse direction y is reduced. In particular, protruding heads of the axial pins 91, 92 protrude to a lesser extent in the transverse direction y toward the first backrest 21 than in an arrangement known from the prior art, in which the axial pins of a locking device extend in the transverse direction.

The features disclosed in the above description, claims and drawings may be significant both individually and in combination for implementing the invention in its various embodiments. While specific embodiments of the invention have been shown and described in detail to illustrate the application of the principles of the invention, it will be understood that the invention may be embodied otherwise without departing from such principles.

The invention claimed is:

1. A vehicle seat comprising a seat segment which comprises:
    a first seating space having a first backrest which can be pivoted about a pivot axis which extends in the transverse direction and
    a second seating space having a second backrest which can be pivoted about the pivot axis;
    a locking device arranged on the second backrest; and
    a curved locking member provided on the first backrest, wherein the locking device comprises at least one axial pin with a longitudinal axis that extends in an inclined manner relative to the transverse direction, wherein the locking device comprises a rotary latch which is pivotably supported about the axial pin.

2. The vehicle seat as claimed in claim 1, wherein the longitudinal axis defines with the transverse direction an inclination angle of from 5° to 15°.

3. The vehicle seat as claimed in claim 2, wherein the longitudinal axis defines with the transverse direction an inclination angle of 10°.

4. The vehicle seat as claimed in claim 1, wherein the at least one axial pin is not parallel and not perpendicular to the transverse direction.

5. The vehicle seat as claimed in claim 1, wherein the curved locking member comprises a locking region around which the rotary latch engages when the locking device is locked to the curved locking member.

6. The vehicle seat as claimed in claim 5, wherein the locking region is constructed to be substantially linear and to extend along a curved member axis.

7. The vehicle seat as claimed in claim 6, wherein the curved member axis extends in an inclined manner relative to the transverse direction.

8. The vehicle seat as claimed in claim 6, wherein the curved member axis defines with the transverse direction an inclination angle of from 5° to 15°.

9. The vehicle seat as claimed in claim 8, wherein the curved member axis defines with the transverse direction an inclination angle of 10°.

10. The vehicle seat as claimed in claim 6, wherein, when the locking device is locked to the curved locking member, the curved member axis extends parallel with the longitudinal axis of the axial pin.

11. The vehicle seat as claimed in claim 1, wherein the locking device comprises an additional axial pin about which at least one of a clamping cam and a catch cam which serves to secure the rotary latch when the locking device is locked is pivotably supported.

12. The vehicle seat as claimed in claim 11, wherein the additional axial pin has another longitudinal axis which extends parallel with the longitudinal axis of the axial pin, about which the rotary latch is pivotably supported.

13. A vehicle seat comprising a seat segment which comprises:
   a first seating space having a first backrest which can be pivoted about a pivot axis which extends in the transverse direction; and
   a second seating space having a second backrest which can be pivoted about the pivot axis, the second backrest comprising a substantially upright use position and a non-use position;
   a locking device arranged on the second backrest; and
   a curved locking member provided on the first backrest, wherein the locking device comprises at least one axial pin with a longitudinal axis, the longitudinal axis being substantially perpendicular to a vertical direction and inclined relative to the transverse direction and not perpendicular to a travel direction when the second backrest is in the substantially upright use position, the longitudinal axis being substantially perpendicular to the travel direction and inclined relative to the transverse direction and not perpendicular to the vertical direction when the second backrest is in the non-use position.

14. The vehicle seat as claimed in claim 13, wherein the first backrest comprises a substantially upright first backrest use position and a first backrest non-use position, the longitudinal axis being substantially perpendicular to the vertical direction and inclined relative to the transverse direction and not perpendicular to the travel direction when the first backrest is in the substantially upright first backrest use position, the longitudinal axis being substantially perpendicular to the travel direction and inclined relative to the transverse direction and not perpendicular to the vertical direction when the first backrest is in the first backrest non-use position.

15. The vehicle seat as claimed in claim 13, wherein the locking device comprises a rotary latch which is pivotably supported about the axial pin.

16. A vehicle seat comprising a seat segment which comprises:
   a first seating space having a first backrest which can be pivoted about a pivot axis which extends in the transverse direction and
   a second seating space having a second backrest which can be pivoted about the pivot axis;
   a locking device arranged on the second backrest; and
   a curved locking member provided on the first backrest, wherein the locking device comprises at least one axial pin with a longitudinal axis inclined relative to the transverse direction, wherein the longitudinal axis is not parallel to the transverse direction and the longitudinal axis is not perpendicular to the transverse direction.

17. The vehicle seat as claimed in claim 16, wherein the second backrest comprises a substantially upright use position and a non-use position, the longitudinal axis being substantially perpendicular to a vertical direction and inclined relative to the transverse direction and not perpendicular to a travel direction when the second backrest is in the substantially upright use position, the longitudinal axis being substantially perpendicular to the travel direction and inclined relative to the transverse direction and not perpendicular to the vertical direction when the second backrest is in the non-use position.

18. The vehicle seat as claimed in claim 17, wherein the first backrest comprises a substantially upright first backrest use position and a first backrest non-use position, the longitudinal axis being substantially perpendicular to the vertical direction and inclined relative to the transverse direction and not perpendicular to the travel direction when the first backrest is in the substantially upright first backrest use position, the longitudinal axis being substantially perpendicular to the travel direction and inclined relative to the transverse direction and not perpendicular to the vertical direction when the first backrest is in the first backrest non-use position.

19. The vehicle seat as claimed in claim 16, wherein the locking device comprises a rotary latch which is pivotably supported about the axial pin.

\* \* \* \* \*